June 23, 1953 — J. R. LOWRY — 2,643,031
FERTILIZER DISTRIBUTOR
Filed Dec. 31, 1949 — 2 Sheets-Sheet 1

JEFFERSON R. LOWRY
INVENTOR.

BY *Cecil L. Wood*

ATTORNEY

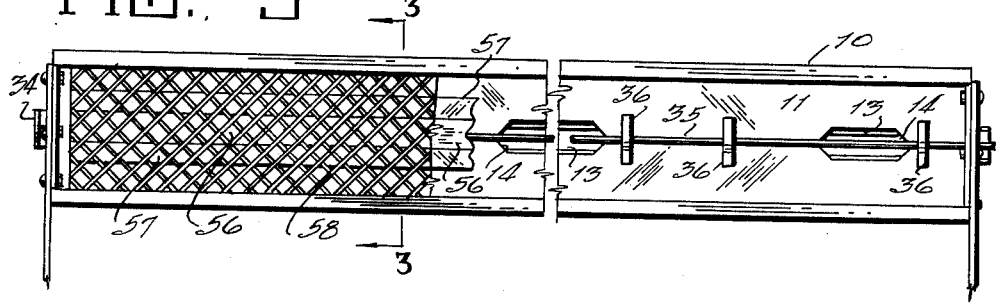

Patented June 23, 1953

2,643,031

UNITED STATES PATENT OFFICE 2,643,031

FERTILIZER DISTRIBUTOR

Jefferson R. Lowry, Fort Worth, Tex.

Application December 31, 1949, Serial No. 136,350

4 Claims. (Cl. 222—177)

This invention relates to apparatus for spreading or distributing soil-building products, such as lime, phosphate, and other fertilizing materials, and it has particular reference to a mechanism having a special adaptation to the uniform distribution of such products over the soil to improve the same for cultivation and the production of legume and grazing vegetation, and it has particular reference to a mechanism adapted to be drawn behind a tractor, or other motive power, either in combination with a seeder, such as a grain drill, or as an individually mounted unit, embodying a mechanism for agitating and evenly distributing the products through the medium of traction provided by a wheeled carriage supporting the apparatus, thus affording a mechanism which can be employed, at will, for the distribution of soil-enriching products, such as commercial fertilizers, including lime and phosphate, in combination with or apart from the seeding operations which are engaged upon in the development of agricultural operations.

The invention further comprehends the provision of a simple and inexpensive mechanism in which is provided a hopper of any desired length, adapted to cover a predetermined area of agricultural land and mounted upon a supporting carriage which is capable of transmitting motion to certain elements whereby to discharge measured quantities of the products from the hopper, as desired, to insure even distribution thereof in accordance with the deficiency of the soil.

Broadly, the invention contemplates the provision of a simple and inexpensive mechanism whereby proper soil treatment may be resorted to by farmers having relatively limited means, enabling all persons in agricultural pursuits to enjoy the advantages of soil enhancement without expending substantial sums for machinery and equipment, since it is a prime object of the invention to afford a mechanism which is capable of utilization in the distribution, at a minimum of expense, any type of commercial soil building products, including certain types of seeds.

While the foregoing objects are paramount, other and lesser objects will become manifest as the description proceeds, taken in connection with the appended drawings, wherein.

Figures 2, 3:
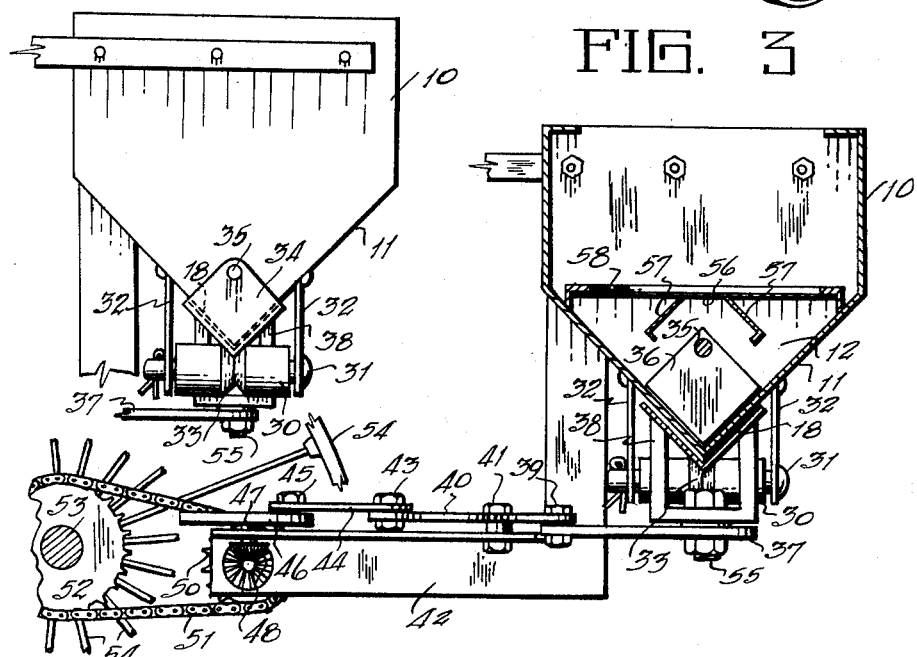
Figure 2 is a fragmentary end view of the invention, illustrating the agitator mechanism at the bottom of the hopper.

Figure 3 fragmentarily illustrates the invention, in transverse section, shown connected to a carriage on which is supported a conventional type of seeder, and illustrating the driving mechanism therefor.

Figure 4:
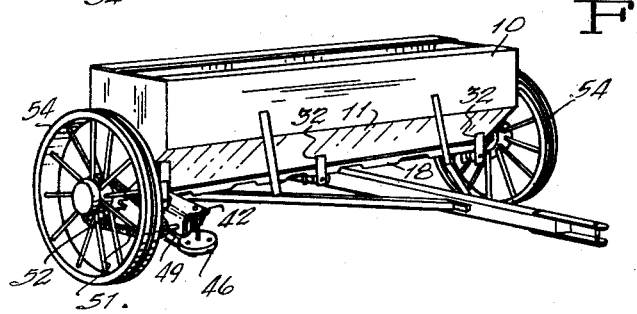

Figure 4 is a perspective illustration of the invention shown mounted on an individual carriage and adapted as a lime or fertilizer spreader independently of a seeder.

Figure 5 is a plan view of the invention, showing portions thereof cut away to illustrate the converging sides of the hopper, the discharge outlet, the baffle, and foraminous cover.

Figure 6 fragmentarily illustrates, in elevation, the discharge outlet and mechanism for actuating the agitator mechanism, shown in dotted lines, and the angular V-shaped plate for closing the outlet.

Figure 7 is an isometric illustration, fragmentarily illustrating the angular V-shaped plate and illustrating the driving mechanism therefor, and Figure 8 fragmentarily illustrates, in perspective, the V-shaped plate providing a closure for the bottom of the hopper and the lever mechanism pivoted thereto for longitudinally actuating the same.

Accordingly, therefore, the invention has a hopper 10 which may be of any desired length and whose bottom portion comprises a pair of downwardly and inwardly inclined sides 11 converging downwardly forming a substantially V-shaped trough 12 along which are arranged a series of spaced elongated openings 13 and have their ends 14 substantially pointed, as especially illustrated in Figure 5. The openings 13 may be spaced, as desired, according to the amount of lime, or other products, required to be distributed over a given area by the invention.

Figure 1:
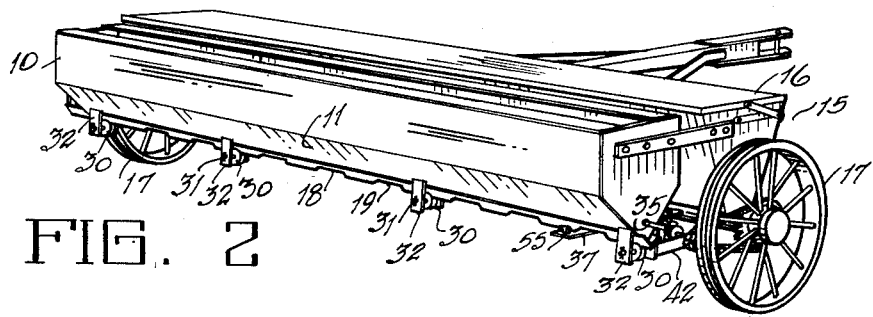
Figure 1 is a perspective view of a conventional type of seeder with which the invention is shown operatively connected.

As illustrated in Figure 1 the device may be employed with the conventional type of grain drill or seeder 15, the hopper of which is supported on a wheeled carriage whose traction wheels 17 are adapted to drive the agitating and discharge mechanism of both the drill 15 and the invention herein described, a novel driving mechanism being provided and illustrated in Figures 3 and 7. Slidably arranged longitudinally of the trough 12 of the hopper 10, and conformable to the underside thereof, is an angular V-shaped plate 18 which is adapted to slide along the hopper 10, a series of spaced ports 19, similar to the openings 13 of the hopper 10, being formed in the member 18, and capable of registering with the openings 13 as the member 18 is moved in a sliding motion longitudinally of the hopper 10, as indicated in dotted lines in Figure 6.

The substantially V-shaped member 18 is supported by spaced rollers 30 which are pivoted on pins 31 arranged transversely of the hopper 10 and suspended from the sides 11 thereof by brackets 32. Each of the rollers 30 has a V-shaped circumferential groove 33 therein conformable to the lower angular edge of the member 18, as illustrated in Figures 2 and 3, to expedite the sliding reciprocating motion of the member 18 with respect to the openings 13 in the bottom of the hopper 10.

At one end of the hopper 10 is arranged a plate 34, which is integral with the member 18, and attached to its upper end is a shaft 35 which extends longitudinally through the hopper 10 to its opposite end so that this member is adapted to move with the member 18 as the latter is moved by a mechanism to be hereinafter described. Spaced along the shaft 35, interiorly of the hopper 10 and in the bottom 12 thereof, are a series of rectangular plates 36 which are arranged with their parallel edges diagonal with respect to a vertical plane so that they conform to and are parallel with the inclined sides 11 of the hopper 10 in the manner shown in Figure 3. Thus, when the member 18 is moved in a reciprocating motion longitudinally of the hopper 10 the plates 36, being integrally connected to the member 18 through the shaft 35, are accordingly moved with respect to the openings 13 to continually agitate the contents of the hopper 10 and move the same toward the openings 13 to cause the same to be discharged therethrough, the ports 19 in the member 18 being brought into registration with the openings 13 in proper timing to permit the discharge of the contents of the hopper 10 in predetermined quantities.

The sliding member 18, with the plates 36, is moved longitudinally of the hopper 10 by a driven linkage illustrated in Figures 3 and 7. The linkage comprises a lever 37 pivotally connected at one end to the member 18 through a bracket 38, as illustrated particularly in Figure 8, while the opposite end of the lever 37 is pivotally connected by a bolt 39, or other device, to a fulcrum lever 40 which is substantially V-shaped and has a pivotal connection 41 to an angular frame member 42 which supports the hopper 10 on the wheeled carriage illustrated in Figures 1 and 4. The opposite end of the fulcrum 40 has a pivot 43 through a link 44, the opposite end of the latter being pivoted through a bolt or pin 45 to an eccentric or crank-wheel 46 on a shaft 47 which is rotated through a cone-gear or bevelled pinion assembly 48 through a shaft 49 and a sprocket 50, over which a chain 51 is arranged and driven through the medium of a sprocket 52 on the axle 53 of the carriage, the wheels 54 providing ground traction for the assembly.

It will be observed, by reference to Figures 3 and 7, that the reciprocating motion of the member 18 and the plates 36 is accomplished by the action of the eccentric 46 which oscillates the fulcrum member 40 through the linkages 44 and 37 to impart motion to the member 18 which, in turn, is integrally connected through the plate 34 and the shaft 35 to the plates 36 within the hopper 10. The frame member 42, when the invention is employed independently and separate from the conventional drill, as shown in Figure 1, extends forwardly of the carriage, as illustrated in Figure 4, and supports the eccentric member 46 and the linkage assembly on one side of the carriage. The bracket 38, by which the lever 37 is connected to the member 18, is illustrated in detail in Figure 8 and comprises a substantially U-shaped member whose legs extend upwardly and are welded, or otherwise secured, to the member 18, a pivot 55 being provided through the medium of a bolt.

The invention is especially designed for the distribution of lime, phosphate, or other commercial fertilizers or soil aids, which have a consistency of a powder or a comminuted substance, and some of the products require constant agitation to be properly discharged through the openings 13 in the bottom of the hopper 10. To properly distribute the product to the angular trough 12 in the bottom of the hopper 10 it is desirable to provide a baffle member 56 extending longitudinally through the hopper 10 and spaced above the shaft 35 and the series of plates 36 therein, in the manner illustrated in Figure 3, providing a hood having downwardly inclined sides 57 to direct the contents of the hopper 10 to the inclined sides 11 and thence into the trough 12 where the substance is engaged by the plates 36 to be moved backwardly and forwardly toward the openings 13, the latter being opened and closed by the member 18 as the ports 19 therein are moved into and out of register with the openings 13. A foraminous plate 58, arranged longitudinally of the hopper 10 and in a horizontal position, as shown in Figures 3 and 5, is preferably provided to aid in retarding the movement of lumpy portions of the product deposited in the hopper 10, only the finer aggregate being allowed to pass into the trough 12 into the path of the plates 36 to be discharged through the openings 13, it being desirable to occasionally break up the larger lumps of the product into a finer aggregate so that a uniform distribution thereof will result.

Manifestly, the structure herein shown and described is capable of certain changes and modifications, from time to time, without departing from the spirit and intent of the invention or the scope of the appended claims.

What is claimed is:

1. In a lime and fertilizer distributor, in combination, a hopper having its lower sides converging downwardly defining an angular trough longitudinally of said hopper, a plurality of spaced openings along the lower angular edge of said trough, an angular member, substantially V-shaped in transverse section, conformably arranged beneath the said trough and slidable reciprocally with respect thereto, a plurality of ports in said angular member corresponding to the openings in said trough and capable of alternately registering with said openings in said trough, roller means supporting the said angular member, a series of vertically and diagonally arranged flat rectangular spaced plates arranged interiorly of said trough and rigidly connected by a shaft extending longitudinally thereof, means rigidly connecting said shaft to said angular member, and means for moving said plates and said angular member in a reciprocating sliding motion along the bottom of said trough.

2. In a lime and fertilizer spreader, in combination, a hopper having angular sides converging downwardly defining a substantially V-shaped trough, a series of spaced openings in the bottom of said trough, an angular member, substantially V-shaped in transverse section, slidably and reciprocally arranged beneath the said trough and conformable thereto, a series of ports in said angular member spaced therealong and capable of alternate registration with the openings in said trough, a series of longitudinally spaced, rectangular plates arranged vertically and diagonally in said trough and having angular edges conformable to the sides thereof, a shaft rigidly connecting the said plates and a connection between said shaft and said angular member, operative means supporting said angular member and said plates in an integral unit, and means for moving said angular member and said plates in a reciprocating motion longitudinally of said hopper.

3. In a lime and fertilizer spreader, in combination, a wheeled carriage having a hopper supported thereon, the said hopper having sides converging downwardly defining a substantially V-shaped trough in the bottom of said hopper, a series of spaced openings in the bottom of said trough, an angular plate, substantially V-shaped in transverse section, arranged beneath and in reciprocable sliding contact with said trough, ports in said angular plate conformable to and capable of registering with the openings in the bottom of said trough, a series of vertically arranged, longitudinally spaced flat rectangular plates arranged diagonally and transversely of said trough interiorly thereof, a shaft rigidly connecting the said plates and said V-shaped angular plate, and means comprising a plate externally of one end of said hopper connecting said V-shaped angular plate and said angular plates in an integral agitating unit, and means operatively connecting said unit with the wheels of said carriage whereby to impart a reciprocating motion to said agitating unit as said carriage is advanced.

4. In an agricultural implement, a lime and fertilizer spreader comprising, in combination, a wheeled carriage having a hopper supported thereon, the sides of said hopper extending downwardly and converging at their lower ends defining a substantially V-shaped trough, an angular V-shaped plate arranged in conformable reciprocable sliding association beneath the bottom of said trough, a series of spaced openings in the bottom of said trough, spaced ports in the said angular plate capable of alternate registration with the openings in the said trough, a series of diagonally arranged flat rectangular plates longitudinally spaced along the interior of said trough, a shaft rigidly connecting the said angular plates with said angular V-shaped plate providing an integral assembly, roller means supporting the said assembly, and means for imparting a sliding reciprocatory movement to said assembly as the machine is moved along.

JEFFERSON R. LOWRY.

References Cited in the file of this patent
UNITED STATES PATENTS

| Number | Name | Date |
|---|---|---|
| 1,059,206 | Porcher | Apr. 15, 1913 |
| 1,829,627 | Bamford et al. | Oct. 27, 1931 |
| 1,894,008 | Segars | Jan. 10, 1933 |
| 2,219,505 | Pierson et al. | Oct. 29, 1940 |
| 2,350,107 | Gandrud | May 30, 1944 |
| 2,416,804 | Ulrich | Mar. 4, 1947 |